United States Patent [19]

Sawada et al.

[11] Patent Number: 4,920,504

[45] Date of Patent: Apr. 24, 1990

[54] DISPLAY MANAGING ARRANGEMENT WITH A DISPLAY MEMORY DIVIDED INTO A MATRIX OF MEMORY BLOCKS, EACH SERVING AS A UNIT FOR DISPLAY MANAGEMENT

[75] Inventors: Hachiro Sawada; Tadashi Fujitsu; Ken-ichi Takahashi; Hideaki Honma, all of Tokyo, Japan

[73] Assignee: NEC Corporation, Tokyo, Japan

[21] Appl. No.: 908,432

[22] Filed: Sep. 17, 1986

[30] Foreign Application Priority Data

Sep. 17, 1985 [JP] Japan ............................... 60-203478
Dec. 13, 1985 [JP] Japan ............................... 60-280368

[51] Int. Cl.[5] ............................................ G06F 3/153

[52] U.S. Cl. .................................... 364/521; 340/750; 340/799

[58] Field of Search ................................ 340/726–728, 340/749, 798, 799, 750; 364/518, 521

[56] References Cited

U.S. PATENT DOCUMENTS

| | | | |
|---|---|---|---|
| 4,196,430 | 4/1980 | Denko | 340/726 |
| 4,197,590 | 4/1980 | Sukonick et al. | 340/726 X |
| 4,489,317 | 12/1984 | Shiba | 340/726 |
| 4,491,834 | 1/1985 | Oguchi | 340/726 |
| 4,642,790 | 2/1987 | Minshull et al. | 340/726 X |
| 4,649,377 | 3/1987 | Urabe | 340/749 X |

*Primary Examiner*—David L. Clark
*Attorney, Agent, or Firm*—Sughrue, Mion, Zinn, Macpeak & Seas

[57] ABSTRACT

In a display managing arrangement comprising a display memory and a display memory controller for accessing the display memory to display a selected area of an image datum with the selected area scrolled on the image datum or otherwise subjected to management, the display memory is divided into memory blocks arranged as an N-row M-column matrix. Each memory block is for use as a unit of the management and is divisible into memory elements arranged as an n-row m-column matrix. When the memory elements of the display memory are assigned with serial memory element addresses along each row of the memory elements of the display memory and then along a next column-wise downward row, the memory controller may access the memory elements of selected ones of the memory blocks in block parallel by specifying the serial memory element addresses for each memory block on the one hand from a least memory element address in the memory block under consideration consecutively to the serial memory element address which is equal to the least memory element address plus the number m less one. On the other hand, the serial memory element addresses are specified discretely along one of the m columns by adding products of a step value mM and multipliers variable from zero to the number n less one to one of the serial memory element addresses that is congruent with the least memory element address modulo the step value. On storing the selected area in the display memory, the image datum may likewise be accessed.

4 Claims, 10 Drawing Sheets

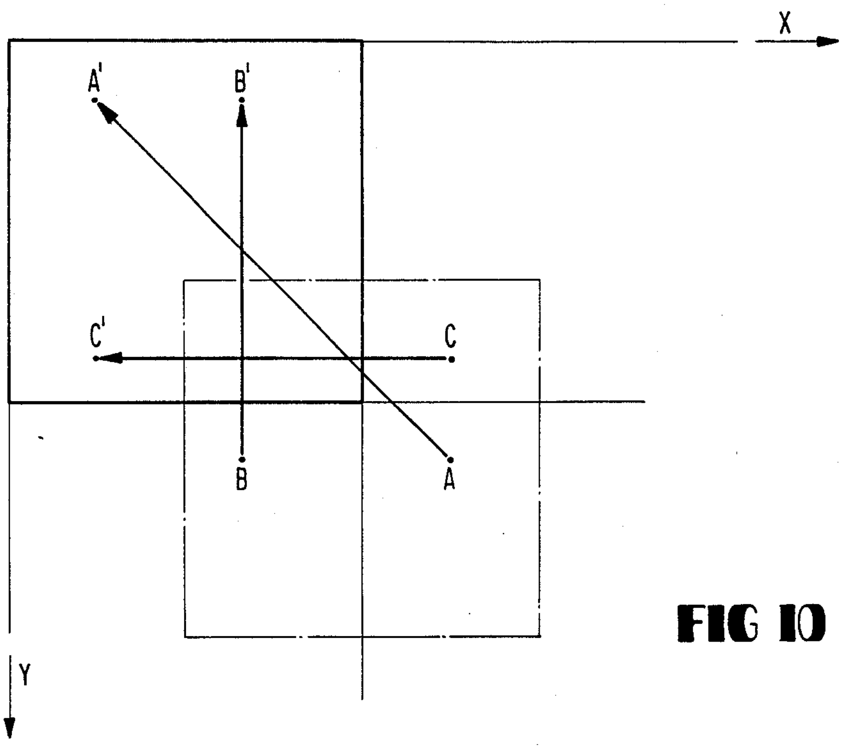
FIG 10
FIG 12
PRIOR ART
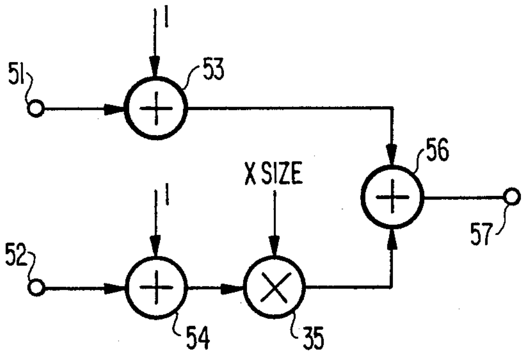
FIG 13
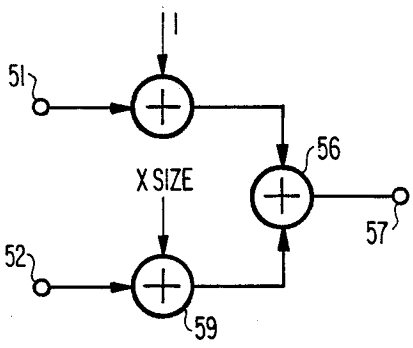

DISPLAY MANAGING ARRANGEMENT WITH A DISPLAY MEMORY DIVIDED INTO A MATRIX OF MEMORY BLOCKS, EACH SERVING AS A UNIT FOR DISPLAY MANAGEMENT

BACKGROUND OF THE INVENTION

This invention relates to a display managing arrangement for use in displaying a selected region of an image datum on a display screen with the selected region either scrolled on the image datum or otherwise subjected to management.

The display managing arrangement comprises a display memory and a display memory controller in the manner which will later be described in detail. Such a display managing arrangement is already known. For example, a display system with multiple scrolling regions is revealed in U.S. Pat. No. 4,412,294 issued to LaVaughn F. Watts et al and assigned to Texas Instruments Incorporated.

The image datum is typically a two-dimensional image datum. It is usual that the image datum is divided into a plurality of file data which are memorized in a plurality of files, respectively. Two of the file data may or may not have a common datum. On scrolling the selected region as a display part of the image datum, a selected area of the image datum is preliminarily transferred to the display memory and stored therein as an image part from at least one of the files. The display memory is thus loaded with the image part which should have a wider area than the display part. The display memory has serial element addresses at which picture elements of the image part are stored, respectively.

When the display part should be scrolled to include a region beyond the image part stored in the display memory at that time as a first image part, that region must be transferred afresh to the display memory as a new region from the file or files. A considerable portion of the first image part is retained in the display memory as a retained region. Inasmuch as the display memory has a limited memory capacity, a region of the first image part must be deleted from the display memory as a previous region. A second image part is substituted for the first image part in the display memory to comprise the retained and the new regions. In other words, the display memory is renewed or updated.

The display memory controller is used in accessing the display memory on carrying out management thereon, namely, on displaying the display part on the display screen, scrolling the display part, and renewing the display memory. In a conventional display managing arrangement, the display memory controller is typically a graphic display controller for carrying out address control on the display part or on the image part. The conventional display managing arrangement is incapable of, among others, renewing the display memory at a high speed.

SUMMARY OF THE INVENTION

It is therefore an object of the present invention to provide a display managing arrangement comprising a display memory for storing an image part of an image datum with a display part subjected to display among the image part and to scrolling on the image datum, wherein the display memory can be renewed at a high speed whenever renewal becomes necessary for the display memory as a result of the scrolling.

Other objects of this invention will become clear as the description proceeds.

A display managing arrangement to which this invention is applicable, is for use in carrying out management on a display part in an image part of an image datum with the display part scrolled on the image datum and comprises a display memory for storing the image part and a display memory controller for controlling the display memory to carry out the management. According to this invention, the display memory is divided into a plurality of memory blocks arranged as a matrix of rows, N in mumber, and columns, M in number, and assigned with serial block addresses, respectively, each memory block serving as a unit for the management, the display memory controller being for accessing the display memory by using the numbers M and N in specifying the serial block addresses.

Each of the memory blocks comprises a plurality of memory elements arranged as another matrix of rows, n in number, and columns, m in number, and having serial memory element addresses, the serial memory element addresses consecutively increasing along each row of the memory elements of the display memory and stepwise increasing by a block step value mM between two column-wise consecutive ones of the memory elements.

The display memory controller includes determinant register memorizing signals representative of the numbers m and n, the step value, a block column range, and a block row range. The block column and row ranges specify specific memory blocks by the numbers M and N. It also includes a top address register memorizing a signal representative of a top address for each of the memory blocks of the display memory, and a first address generator coupled to the determinant register and to the top address register for generating a first address signal representative of a first portion of the serial memory element addresses for each of the specific memory blocks. The first portion is consecutive from the top address to one of the serial memory element addresses that is equal to the top address plus m less one, and a second address generator coupled to the determinant register and to the top address register for generating a second address signal representative of a second portion of the serial memory element addresses. The second portion is congruent modulo the block step value with the top address plus integral multiples of the step value, the integral multiples being from zero to the number n less one. Accessing means are connected to the first and second address generators and to the display memory for accessing the serial memory element addresses of each of the specific memory blocks.

BRIEF DESCRIPTION OF THE DRAWING:

FIG. 10 shows a part of the image datum and also the image part mentioned in conjunction with FIGS. 4(A) to (D);

FIG. 12 is a block diagram of a conventional address generator;

FIG. 13 is a block diagram of an improved address generator;

Figure 1:
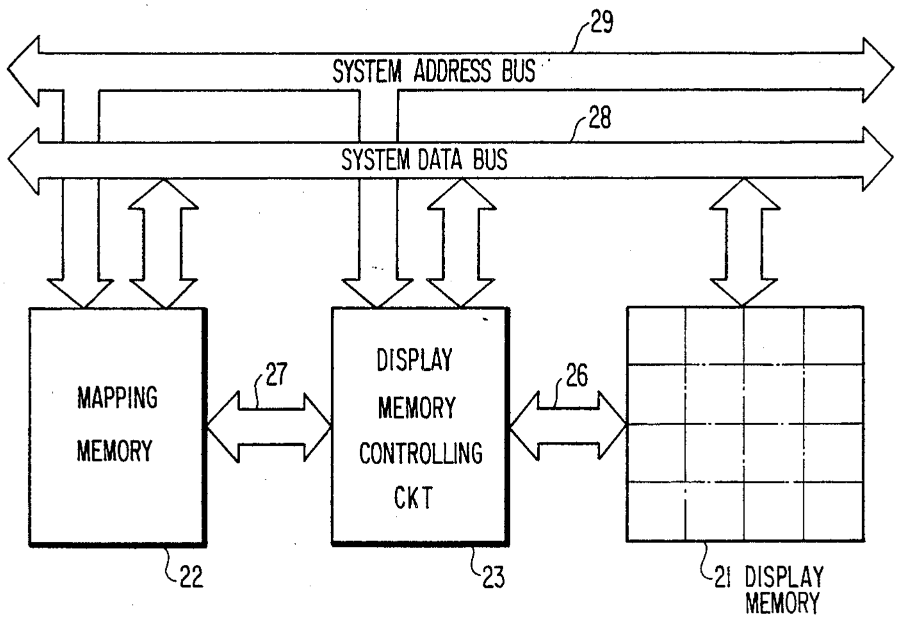
FIG. 1 is a block diagram of a display managing arrangement according to an embodiment of the instant invention.

DESCRIPTION OF THE PREFERRED EMBODIMENT:

Referring to FIG. 1, a display managing arrangement comprises a display memory 21, a mapping memory 22, and a display memory controlling circuit 23 according to a preferred embodiment of the present invention. In the manner which will be described in detail in the following, the display memory 21, the mapping memory 22, and the display memory controlling circuit 23 are coupled together to display a selected area of an image datum as a display part on a display screen (not shown) with the display part scrolled on the image datum. A combination of the mapping memory 22 and the display memory controlling circuit 23 serves as a display memory controller. The image datum is typically a two-dimensional image datum, for example, an image datum representative of a geographical map. The image datum may be three or more dimensional image datum, such as an image datum representative of a stereographic picture.

Figure 2:
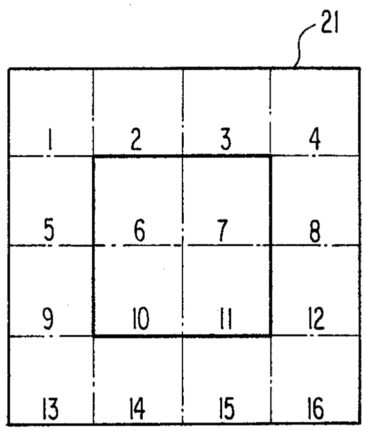
FIG. 2 shows a display memory of the display managing arrangement depicted in FIG. 1.

Turning to FIG. 2, the display memory 21 is divided into a plurality of memory blocks which are arranged as a matrix of N rows and M columns. In the example being illustrated, the matrix has first through fourth rows and first through fourth columns. The rows and the columns are numbered in the manner known in mathematics. The memory blocks are assigned serial or one-dimensional block addresses from one to sixteen in the manner depicted and will be called first through sixteenth memory blocks 211, 212, . . . , and 2116. A reference symbol 21*i* will be used to indicate each memory block with a serial block address i of that memory block suffixed to the reference numeral 21 used for the display memory. As the case may be, the serial block addresses will be referred to as real block addresses for the reason which will later become clear. The display part is exemplified by a thick-line square or rectangle having an upper, a lefthand, a righthand, and a bottom side.

It will be understood from FIG. 2 that the serial block addresses increase one by one rightwards along each row with the serial block addresses of each row increased by the number M downwardly along the columns. As a result, a memory block generally has a serial block address of [K+M(L−1)] when the memory block in question is positioned in an L-th row and a K-th column as counted in the manner described above.

On displaying the display part, the display memory 21 is accessed to produce a display signal which represents the display part with each memory block 21*i* divided into a plurality of memory elements which are arranged as an n-row m-column matrix. Each memory block is therefore represented by signal elements, mn in number, each representative of a memory element. The memory elements of the display memory 21 are assigned with memory element addresses. It is convenient to one-dimensionally or serially assign the memory element addresses to the memory elements of each of the n rows throughout each row of the memory blocks 21*i*'s and then to the memory elements of a row which downwardly next succeeds the row of memory elements under consideration. Such memory element addresses will be named serial or one-dimensional memory element addresses and, alternatively, real memory element addresses.

In connection with the above, it is possible to understand that the rows of the memory blocks 21*i*'s or of the memory elements are parallel to an X axis. The columns of the memory blocks 21*i*'s or of the memory elements are parallel to a Y axis. The X and the Y axes are of a lefthand orthogonal X-Y coordinate system and are directed rightwards and downwards, respectively. The numbers M and N will therefore be referred to as an X and a Y display memory size or simply as an X and a Y memory size. The numbers m and n will be referred to as an X and a Y memory block size or, briefly, as an X and a Y block size.

Figure 3:
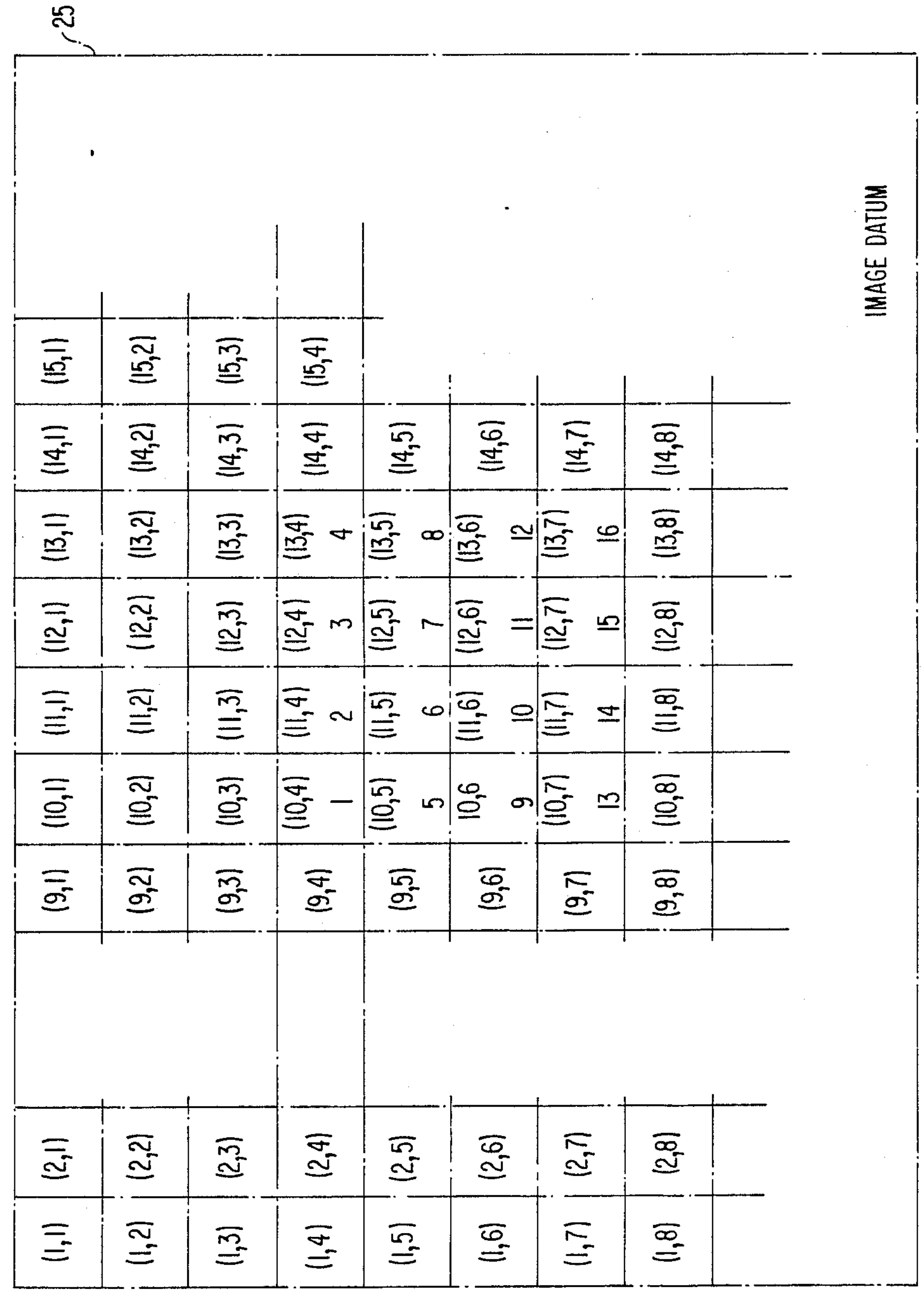
FIG. 3 schematically shows a two-dimensional image datum which is dealt with by the display managing arrangement illustrated in FIG. 1.

Further and turning to FIG. 3, the two-dimensional image datum is indicated at 25 and is divisible into a plurality of block data which are arranged in the image datum 25 again as a matrix. A block signal representative of each block datum can be stored in one memory block 21*i* of the display memory 21 illustrated with reference to FIG. 2. The block data are given matrix or two-dimensional data addresses according to columns and rows of the matrix of the block data. Each block datum is therefore given a combination of a first and a second integer. The first integer represents the column and may be called an X address. The second integer represents the row and may be named a Y address. The combinations of integers are, for example, (1, 1), (2, 1), (3, 1), . . . along the first row and (1, 1), (1, 2), (1, 3), . . . along the first column. Each block datum will be indicated by a reference symbol (x, y). Depending on the circumstances, the matrix data addresses will be called virtual data addresses.

The image datum 25 is divided into a plurality of file data which are memorized in a plurality of files (not shown), respectively. Two of the file data may or may not have a common datum. When it is desired to display a selected area of the image datum 25 as the aforementioned display part, a selected region of the image datum 25 is preliminarily stored in the display memory 21 (FIGS. 1 or 2) as an image part. The selected region should be wider than the display part. It will be assumed merely for simplicity of description that the image part is a selected region of a single file datum. Although the file datum is retained in one of the files even after the image part is stored in the display memory 21, the selected region or the image part will be said to be transferred to the display memory 21 from the file under consideration.

For the example being illustrated, the image part consists of sixteen block data (10, 4), (11, 4), (12, 4), (13, 4), (10, 5), (11, 5), . . . , and (13, 7) enclosed in FIG. 3 with solid lines. The sixteen block data (10, 4), (11, 4), . . . , and (13, 7) are transferred to the first through the sixteenth memory blocks 211, 212, . . . , and 2116 (FIG. 2) in the manner indicated by the serial block addresses 1 through 16 in FIG. 3.

On transferring the image part to the display memory 21 from at least one of the files, an image signal represents the image part with each block datum divided into a plurality of image elements which are similar to the memory elements described before. Signal elements of the image signal represent the respective image elements. By using such an image signal, each block datum (x, y) is transferred to one memory block 21*i*. It is, however, possible according to this invention to transfer a plurality of block data to a plurality of memory blocks 21*i*'s at a time from the file or files. At any rate, each block datum (x, y) is divisible into the image elements arranged as an n-row m-column matrix.

The image elements of the image datum 25 are given image element addresses. Like the memory element addresses described above, it is preferred to assign the image element addresses to the respective image elements at first along each row of the image elements throughout each row of the block data of the image datum 25 and then along that row of the image elements which downwardly next succeeds the row of image elements under consideration. Such image element addresses may be called virtual image element addresses for the reason which will later be understood.

Figure 4:
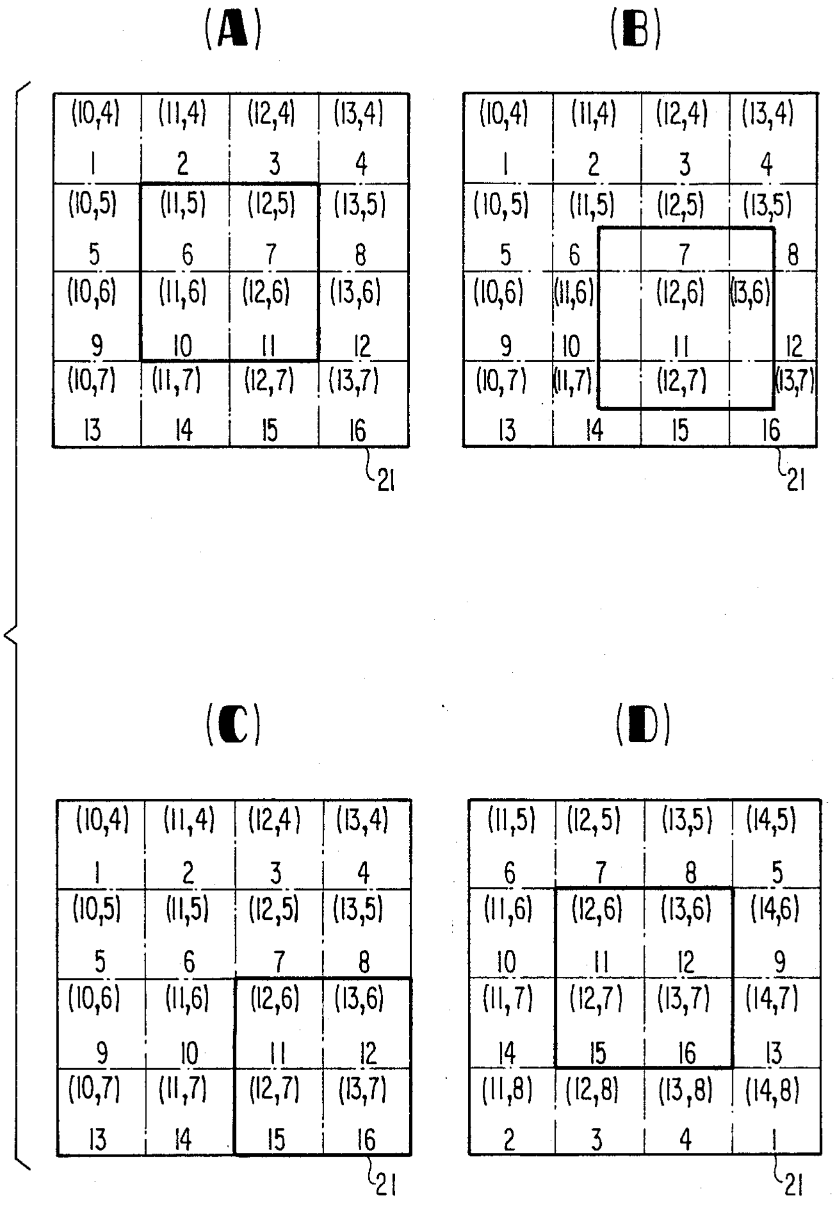
FIGS. 4(A) through (D) show the display memory with a display part scrolled on an image part stored therein and with the image part renewed for continued scrolling.

Referring to FIGS. 4(A) through (D), the display memory 21 is again depicted in each figure part. In FIG. 4(A), the image part is stored in the display memory 21 in the manner described in conjunction with FIGS. 2 and 3. The display part consists of four memory blocks 216, 217, 2110, and 2111 which are loaded with the block data (11, 5), (12, 5), (11, 6), and (12, 6). It will be seen that the display part is surrounded by at least one memory block on each side thereof in the manner exemplified by twelve memory blocks 211 to 215, 218, 219, and 2112 to 2116 which are loaded with the block data (10, 4) to (13, 4), (10, 5), (13, 5), (10, 6), (13, 6), and (10, 7) to (13, 7).

It will be surmised that the display part should be scrolled diagonally of the display memory 21 towards the N-th row M-th column memory block 2116 in the manner depicted at (B) and (C). After the display part is scrolled to a position shown at (C) where the display part has no contiguous memory blocks on the righthand and the bottom sides of the rectangle, those of the block data which are stored in the memory blocks apart from the display part, such as seven memory blocks 211 to 215, 219, and 2113, would no longer be necessary. It is therefore desirable in consideration of a possible monotonous continuation of the scrolling to renew or update the display memory 21 in the manner depicted at (D) so that the display part may again be surrounded by at least one memory block on each side of the rectangle.

Referring more particularly to FIGS. 4(A) or (C) and (D), seven block data (10, 4) to (13, 4), (10, 5), (10, 6), and (10, 7) are deleted from the display memory 21 as a previous region mentioned heretobefore. Instead, seven block data (14, 5), (14, 6), (14, 7), and (11, 8) to (14, 8) are transferred afresh to the display memory 21 as a new region described before. Nine block data (11, 5) to (13, 5), (11, 6) to (13, 6), and (11, 7) to (13, 7) are retained in the display memory 21 as a retained region mentioned before. The nine block data are, however, subjected to a displacement which has a one-column leftward X or row-wise component and a one-row upward Y or column-wise component.

It is possible to understand that the renewal of the display memory 21 is carried out by substituting new serial block addresses for the serial block addresses which were previously assigned as previous serial block addresses to nine memory blocks for the retained region. In the example under consideration, the new serial block addresses are congruent with the previous serial block addresses plus a first summand (M+1) modulo MN for the nine memory blocks. The first summand corresponds to the displacement and may be a negative number.

In FIG. 4(D), it will be seen that seven vacant memory blocks appear row-wise, column-wise, and diagonally of the display part for the new region as three row-wise, three column-wise, and one diagonal vacant memory blocks. The seven vacant memory blocks are given those of the sixteen serial block addresses as seven new serial block addresses which are not assigned to the nine memory blocks in question. More specifically, the three row-wise vacant memory blocks are given three new serial block addresses which are congruent with the previous serial block addresses plus a second summand (MN+1) modulo MN. The three column-wise vacant memory blocks are given three new serial block addresses which are congruent with the previous serial block addresses plus the first summand modulo MN. The diagonal vacant memory block is given a new serial block address which is congruent with the previous serial block address plus the second summand modulo MN. The second summand corresponds again to the displacement. The seven vacant memory blocks are loaded as the new region with those of the block data shown in FIG. 3 which are contiguous to the retained region.

Referring back to FIG. 1, the display memory controlling circuit 23 is for exchanging with the display memory 21 a block address datum representative of the serial block addresses and an element address datum representative of the serial memory element addresses through a local address bus 26. The mapping memory 22 is for memorizing a memory address datum which will presently be described. The display memory controlling circuit 23 exchanges the memory address datum with the mapping memory 22 through a local data bus 27. Based on the memory address datum and the memory and the block sizes M, N, m, and n, the display memory controlling circuit 23 accesses the display memory 21 by using the serial block and memory element addresses.

In the manner which will later become clear, it is possible to access the display memory 21 only by the serial or real memory element addresses. The local address bus 26 may therefore transmit the element address datum alone.

The display memory 21, the mapping memory 22, and the display memory controlling circuit 23 are coupled to a display unit and to the files and a processor through a system data bus 28 of the type described in the Watts et al patent referred to hereinabove. The mapping memory 22 and the display memory controlling circuit 23 are coupled to the display unit and to the files and the processor through a system address bus 29 of the type described in the Watts et al patent. The display unit has the display screen thus far described. The processor is for controlling the display memory controlling circuit 23 in the known manner. If necessary, it is possible to understand that the display unit and the processor are depicted by lefthand and righthand ends of the system data and address buses 28 and 29.

Figure 5:
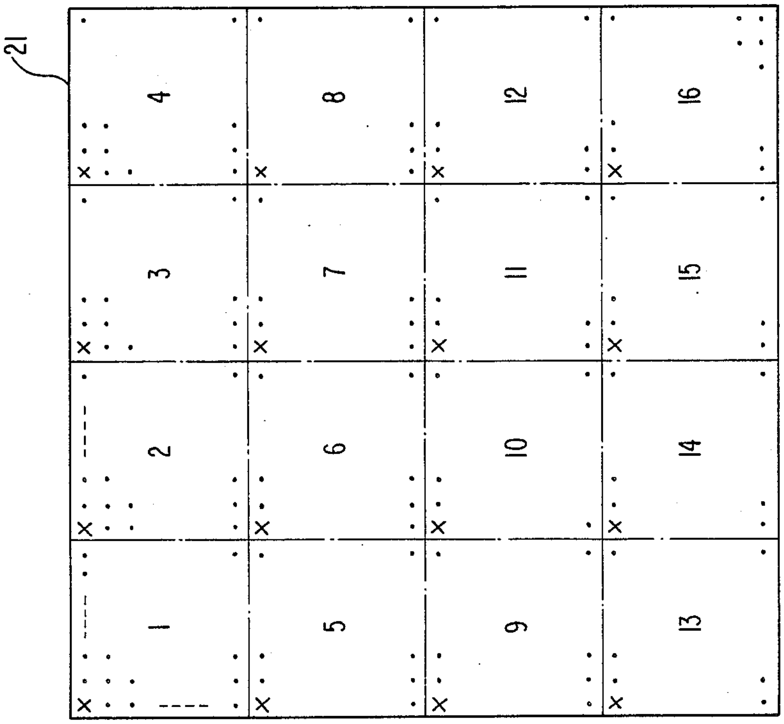
FIG. 5 shows the display memory on an enlarged scale for use in describing access to memory elements thereof.

Turning to FIG. 5, the display memory 21 is once more depicted with the memory blocks indicated by the sixteen serial block addresses used in FIGS. 2 and 4(A) through (C). The memory elements, mn in number in each memory block, are partly indicated by dots. One of the memory elements is indicated in each memory block by a cross rather than by one of the dots. That one memory element has a serial memory element address that is least among the serial memory element addresses of the memory elements of the memory block under consideration. The least serial memory element address will be called a top or head address of the memory block in question and will be designated by a reference letter A followed by a certain one of the numerals 1 through 16. In the example being illustrated, it is presumed that the top addresses are A11, A1, A14, . . . for the first, the second, the third, . . . memory blocks. The top addresses are used collectively as the memory address datum described above.

The top address of the second memory block is greater by m than that of the first memory block. In the memory block positioned next downwardly of a certain one of the memory blocks, the top address is greater by mnM than the top address of that one of the memory blocks. It is therefore understood that the serial or the real block addresses can be represented by the top addresses of the respective memory blocks rather than by the serial block addresses. This applies even if each of the memory blocks of one of the columns or of the rows has a different number of memory elements.

Figure 6:
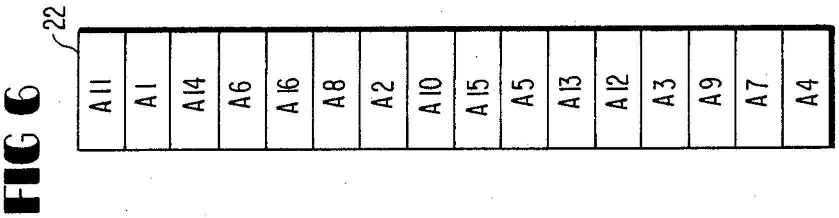
FIG. 6 shows a mapping memory for use in the display managing arrangement depicted in FIG. 1.

Further turning to FIG. 6, the mapping memory 22 is for storing the top addresses of the respective memory blocks in the order of the serial block addresses. On renewing the display memory 21 (FIG. 2 or 5), the mapping memory 22 is renewed accordingly.

Figure 7:
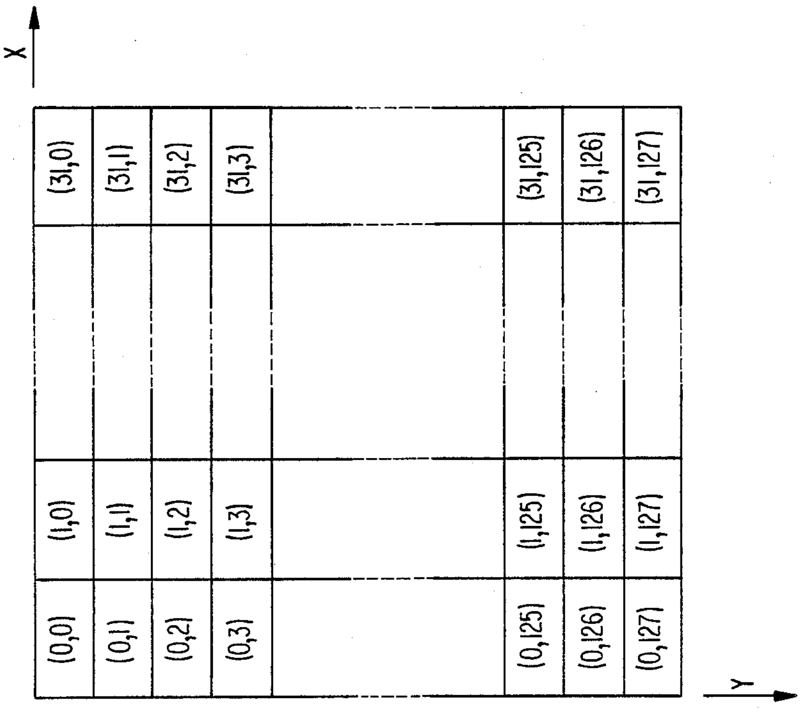
FIG. 7 shows the image datum in another fashion.

Referring now to FIG. 7, a virtual address space corresponds to the image datum of the type illustrated with reference to FIG. 3. The virtual address space is divided into virtual space blocks which are arranged as a matrix of the zero through thirty-first columns, thirty-two in number, and of the zero through one hundred and twenty-seventh rows, 128 in number. The virtual space blocks are given matrix or two-dimensional block addresses in the manner indicated in the respective space blocks. As in FIG. 3, the first integer will be called an X address. The second integer will be named a Y address. Depending on the circumstances, the matrix block addresses will be called virtual block addresses which correspond to the virtual data addresses described before. The virtual address space has an X virtual space size of thirty-two and a Y virtual space size of 128.

Figure 8:
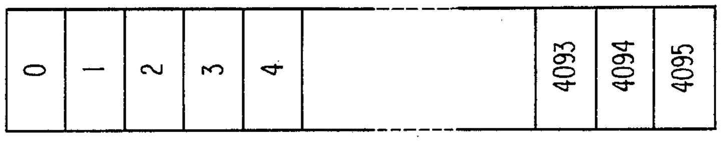
FIG. 8 shows the display memory in a different manner.

Turning to FIG. 8, a real address space corresponds to the display memory described heretobefore. The real address space is divided into real space blocks which are herein arranged one-dimensionally rather than in a matrix fashion. At any rate, the real space blocks are assigned with serial or one-dimensional block addresses which may be called real block addresses as described before. Although the memory blocks are less in number than the block data for the display memory and the image datum described before, it will be assumed for the time being that the real space blocks are equal in number to the virtual space blocks described above. The real block addresses are therefore from zero to 4095, 4096 in number. The real address space has a real space size of 4096.

Figure 9:
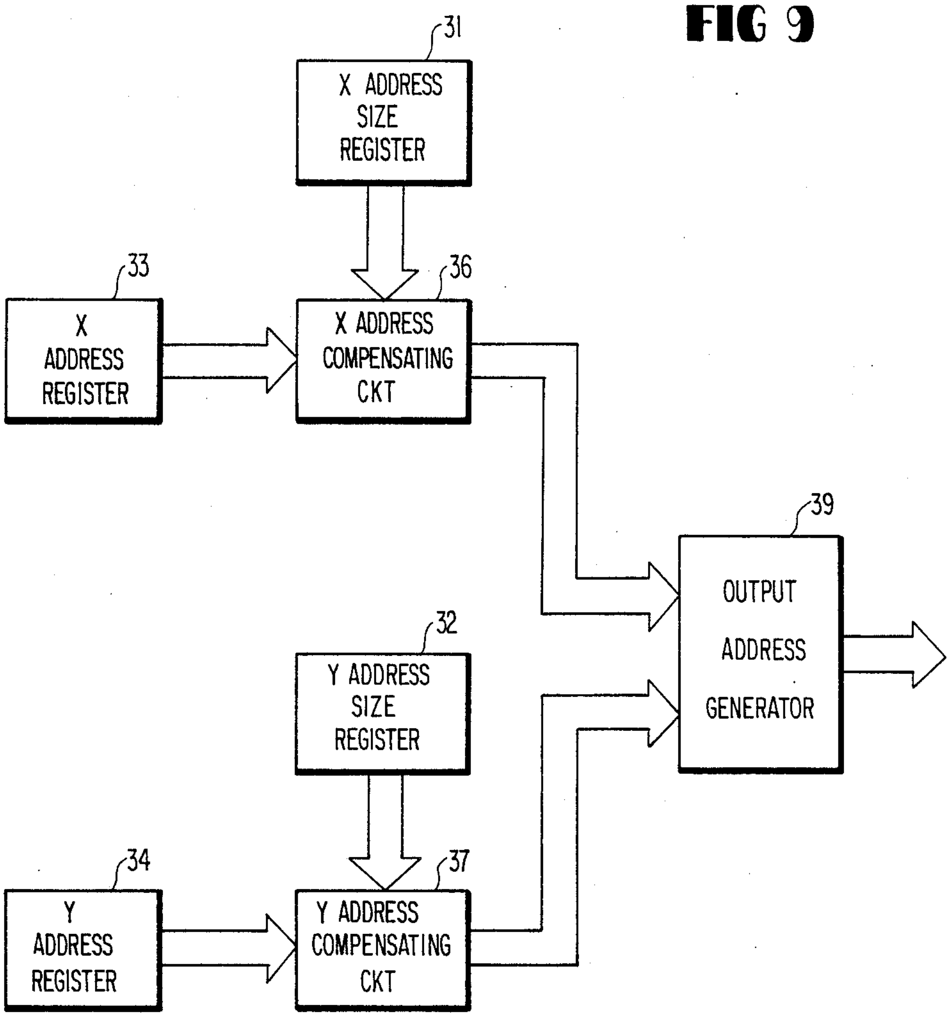
FIG. 9 is a block diagram of an address controlling circuit which can be used as a display memory controlling circuit in the display managing arrangement shown in FIG. 1.

Referring to FIG. 9, an address controlling circuit is for use in assigning a selected region of the virtual address space to the real address space with the selected region subjected to an optional displacement in the virtual address space. The address controlling circuit is therefore operable as the display memory controlling circuit 23 (FIG. 1) in transferring the selected region of the image datum 25 (FIG. 3) to the display memory 21 as the image part. More particularly, the address controlling circuit controls the one-dimensional block addresses as the two-dimensional block addresses of an X real address size and a Y real address size which initially will be designated by Sx and Sy. For the display memory so far described, the X and the Y real address sizes Sx and Sy are equal to the X memory size M and the Y memory size N.

Reference will now be had to FIGS. 7 through 9. The address controlling circuit comprises X and Y real address size registers 31 and 32 in which the X and the Y real address sizes Sx and Sy are preliminarily set. The X and the Y addresses of the virtual address space are set in X and Y address registers 33 and 34. It is possible to understand that each of the X and the Y addresses can be varied in the known manner in the X or the Y address register 33 or 34. By using the X address size Sx set in the X real address size register 31, and X address compensating circuit 36 checks at first whether or not the X address exceeds the X real address size Sx. If the X address exceeds the X real address size Sx, the X address compensating circuit 36 subtracts an integral multiple of the X real address size Sx from the X address to produce an X compensated address. If not, it is possible to understand that the X address compensating circuit 36 subtracts from the X address zero times the X real address size Sx. Similarly, a Y address compensating circuit 37 produces a Y compensated address. An output address generator 39 is for generating the serial or real block addresses by using the X and the Y compensated addresses.

Turning to FIG. 10, the virtual address space is again depicted. It will be assumed that the selected region is a square or rectangle indicated by dash-dot lines. The real address space is assumed to have a memory size indicated by a thick-line square or rectangle when superposed on the virtual address space. It will be appreciated from the following for the serial or real block addresses of the display memory that the renewal of the display memory corresponds to compensation carried out for the X and the Y addresses by the X and the Y address compensating circuits 36 and 37 described in connection with FIG. 9 no matter which direction the optional displacement may have.

When a first combination of the X and the Y addresses represents a first actual point A in the selected region, the X and the Y addresses exceed the X and the Y real address sizes Sx and Sy, respectively. The serial or real block address is generated for the first actual point A by the output address generator 39 (FIG. 9) to indicate a first compensated point A' in the real address space. When a second combination of X and Y addresses represents a second actual point B in the selected region, the serial block address is generated for a second compensated point B' in the real address space. When a third combination of X and Y addresses represents a third actual point C in the selected region, the serial block address is generated for a third compensated point C' in the real address space.

Figure 11:
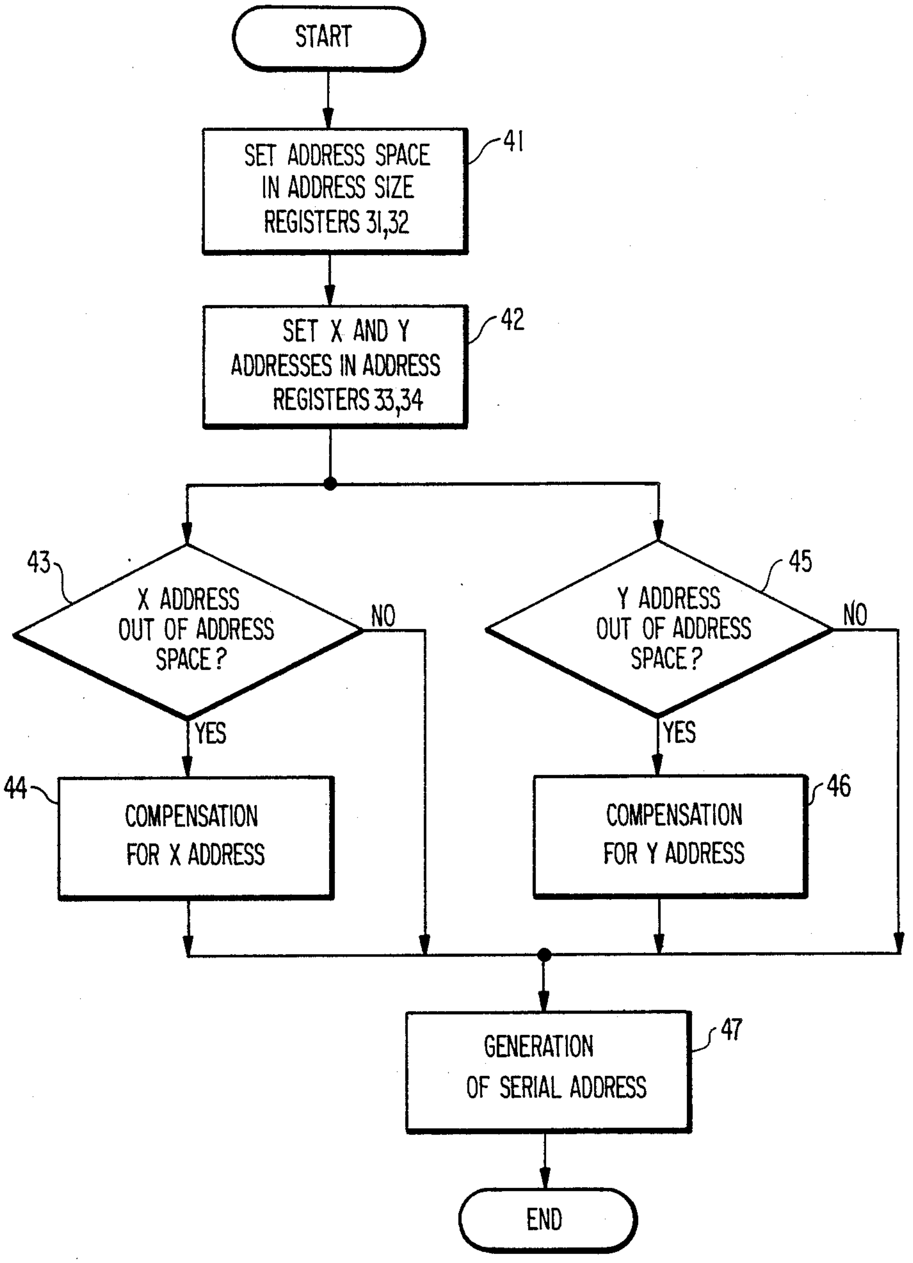
FIG. 11 is a flow chart for use in describing operation of the address controlling circuit depicted in FIG. 9.

Further turning to FIG. 11, a flow chart is shown for use in describing operation of the address controlling circuit illustrated with reference to FIG. 9. Upon starting the operation, the X and the Y real address sizes Sx and Sy are set collectively as a real address space at a first step 41 in the X and the Y real address size registers 31 and 32. It is now very clear that the real address sizes Sx and Sy can optionally be changed. At a second step 42, the X and the Y addresses are set in the X and the Y address registers 33 and 34 and are produced therefrom. At a third step 43, the X address compensating circuit 36 checks in the manner described above whether or not the X address is outwardly of the real address space. If the X address lies outside of the real address space, the X address compensating circuit 36 calculates the X compensated address at a fourth step 44. If not, the X address compensating circuit 36 uses the X address as the X compensated address as it stands. The Y address compensating circuit 37 is likewise operable at fifth and sixth steps 45 and 46. At a seventh step 47, the output address generator 39 generates the serial or real block addresses.

Reviewing FIGS. 7 through 11, the address controlling circuit is operable to generate the serial or real memory element addresses in the respective memory blocks. It should be noted, however, that the memory sizes mM and nN should be used as the real address sizes Sx and Sy and that the mapping memory 22 (FIGS. 1 and 6) should be referenced for the top addresses in the respective memory blocks on setting the X and the Y addresses in the X and the Y address registers 33 and 34. It is possible by so doing to generate the serial memory element addresses in parallel for the respective memory blocks.

Turning to FIG. 12, a conventional address generator may be used as a combination of the X and the Y address registers 33 and 34 and the output address generator 39 described in connection with FIG. 9. The conventional address generator has first and second generator input terminals 51 and 52 supplied with X and Y start addresses, respectively. First and second one-adders 53 and 54 are used to produce consecutively increasing X and Y addresses. A multiplier 55 is for multiplying the Y memory size to produce discrete converted Y addresses. An output adder 56 is for calculating a sum of each of the consecutively increasing X addresses and each of the discrete converted Y addresses. Such sums are delivered to a generator output terminal 57 as the serial block or memory element addresses. It will readily be understood that the X and the Y memory sizes should be the numbers M and N for the serial block addresses and the numbers mM and nN in terms of the memory elements for the serial memory element addresses.

Further and turning to FIG. 13, an improved address generator comprises similar parts which are designated by like reference numerals. It should be noted that the improved address generator comprises a step adder 59 in place of a combination of the second one-adder 54 and the multiplier 55 described in conjunction with FIG. 12. The step adder 59 is for adding the X address size Sx as a step value successively to the Y address whenever the X address reaches the X address size Sx. The X address size Sx should again be the X memory size M for the serial block addresses and the memory size mM in terms of the memory elements for the serial memory element addresses. Inasmuch as no multiplier is used, the improved address generator is operable at a higher speed than the conventional address generator. In addition, it is possible with the improved address genarator to optionally change the X address size Sx.

Figure 14:
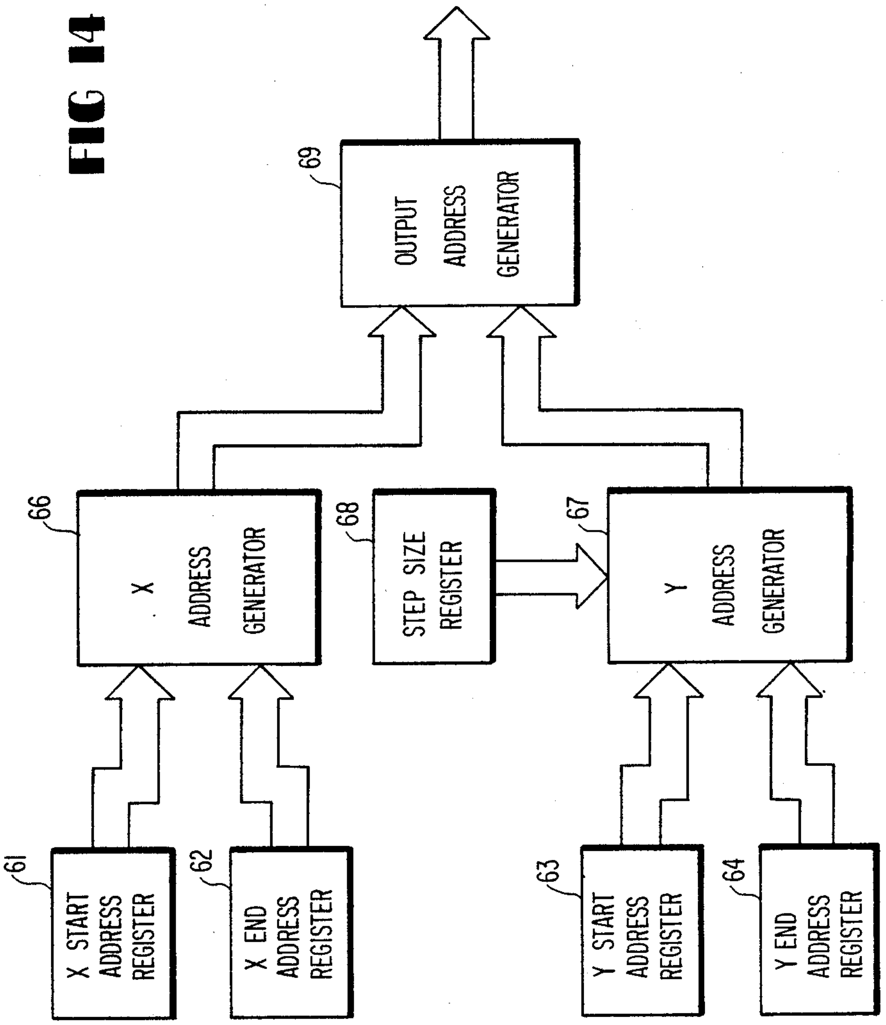
FIG. 14 is a block diagram of another address controlling circuit.

Referring now to FIG. 14, another address controlling circuit comprises X start and end address registers 61 and 62 and Y start and end address registers 63 and 64. It will be assumed at first merely for clarity of description that the address controlling circuit is used in accessing the selected region of the image datum 25 illustrated with reference to FIG. 3.

On specifying the matrix data addresses in the selected region depicted in FIG. 3, the X start and end address registers 61 and 62 are loaded with the X start and end addresses of 10 and 13 for the tenth and the thirteenth columns of the image datum 25. The Y start and end address registers 63 and 64 are loaded with the Y start and end addresses of 4 and 7 for the fourth and the seventh rows. In the manner described in connection with FIG. 13, the Y start and end addresses should in practice be (3Sx+10) and (6Sx+10) where the symbol Sx is now indicative of an X image data size of the image datum 25 in terms of the block data. When the image datum 25 is that illustrated with reference to FIG. 7, the image data size should be the X virtual space size which is equal to thirty-two as described before.

The display memory 21 illustrated with reference to FIG. 2 or 5 will now be accessed by the address controlling circuit being illustrated. The X address size should be the X memory size M on specifying the serial or real block addresses and the X memory size mM on specifying the serial or real memory element addresses. An X address generator 66 is for generating consecutively increasing X addresses from the X start address to the X end address stored in the X start and end address registers 61 and 62. On the other hand, a Y address generator 67 has a structure similar to that portion of the improved address generator illustrated with reference to FIG. 13 which comprises the step adder 59. Supplied with the X address size from a step size register 68, the Y address generator 67 generates the discrete converted Y addresses of the type described above. The consecutively increasing X addresses and the discrete converted Y addresses are used by an output address generator 69 in generating the serial or real block or memory element addresses. The output address generator 69 corresponds to the output adder 56 described in conjunction with FIG. 12 or 13. What should be noted in connection with the address controlling circuit being illustrated, is that it is possible to store the X address size Sx in the step size register 68 with the X step size Sx optionally selected.

Figure 15:
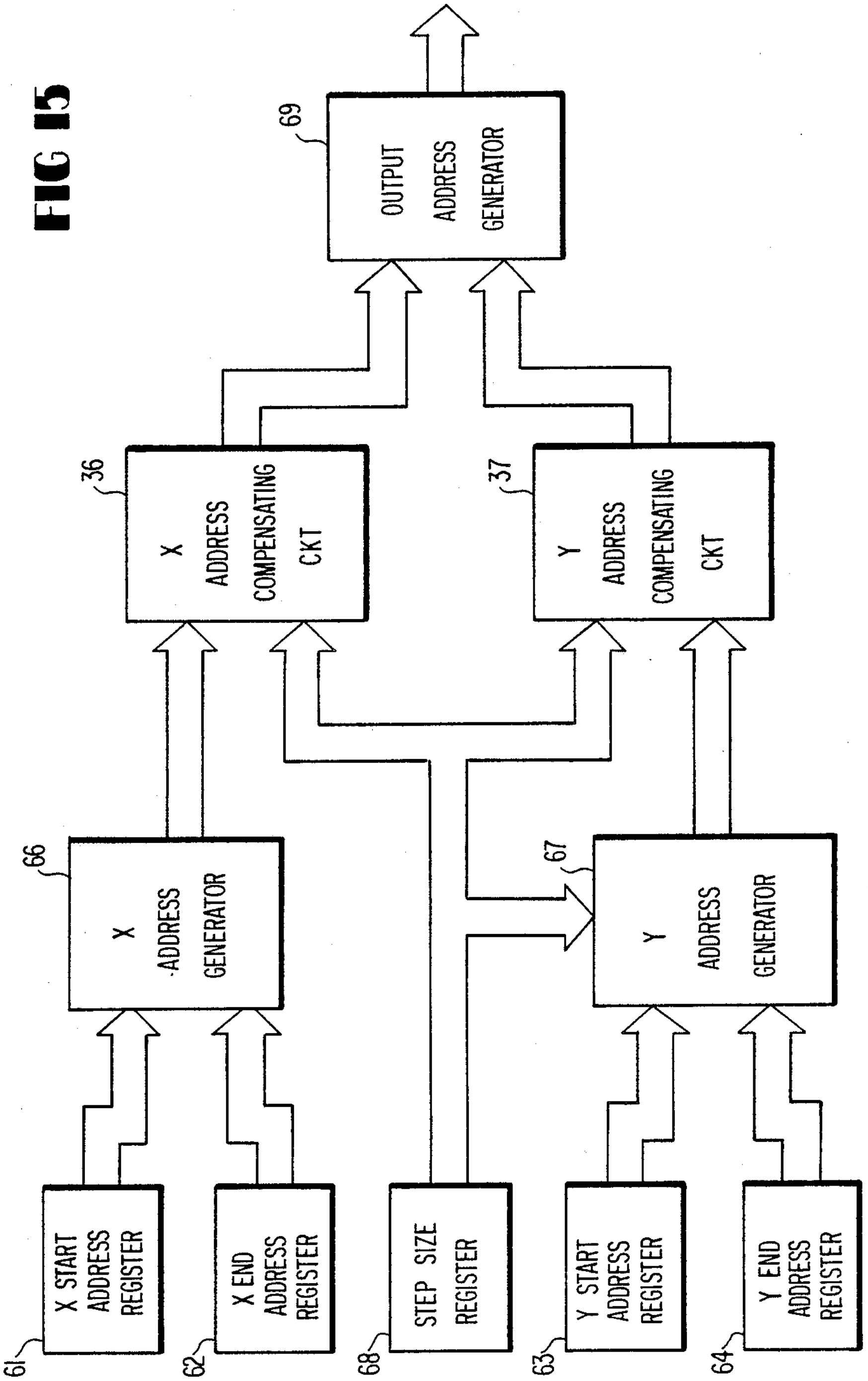
FIG. 15 is a block diagram of an address logic circuit for use as the display memory controlling circuit mentioned in connection with FIG. 9.

Finally referring to FIG. 15, an address logic circuit is for use as the display memory controlling circuit 23 described in conjunction with FIG. 1. The address logic circuit comprises parts which are simlar to circuit elements of the address controlling circuits illustrated with reference to FIGS. 9 and 14 and are designated by like reference numerals. The step size register 68 is, however, loaded also with the Y address size Sy in addition to the X address size Sx.

The Y address generator 67 generates the discrete converted Y addresses by using the X address size Sx stored in the step size register 68. The X address compensating circuit 36 produces the X compensated addresses by using also the X address size Sx. Responsive to each discrete converted Y address rather than to each Y address and supplied with the Y address size Sy from the step size register 68, the Y address compensating circuit 37 produces an address which may be named a discrete Y converted and compensated address. When the X start address register 61 is loaded in parallel with the top addresses stored in the mapping memory 22 described in connection with FIGS. 5 and 6 and furthermore when the Y start address register 63 is loaded with the Y start addresses calculated by using the top addresses and the Y block size n, the output address generator 69 generates the serial memory element addresses which can be used also in specifying the memory blocks by the respective top addresses.

It may be mentioned in connection with the above that the address logic circuit generates the serial memory element addresses from the X start address to the X end address along each row of the memory elements and from the Y start address to the Y end address along each column of the memory elements by using the X address size Sx as the aforementioned step value. In this event, the X address size Sx is equal to the memory size mM expressed in terms of the memory elements. Incidentally, renewal of the mapping memory 22 can be carried out by the processor described in conjunction with the system data and address buses 28 and 29.

Reviewing FIG. 15 together with FIGS. 2 and 6, the address logic circuit may be used as follows on displaying the display part. It is to be noted in this connection that the serial memory element addresses consecutively increase one by one along each row of the memory elements of the display memory 21 and stepwise increase by a block step value mM between two columnwise consecutive ones of the memory elements.

A combination of the X and the Y end address registers 62 and 64 and the step size register 68 will be used collectively as a determinant register for memorizing determinants for the serial memory element addresses. The determinants comprise the numbers m and n, the block step value, a block column range, and a block row range. The block column and row ranges are for specifying specific ones of the memory blocks as specific memory blocks used for the display part. The X start address register 61 serves as a top address register for memorizing a signal representative of the top address for each of the memory blocks of the display memory 21. The Y start address is congruent with the top address modulo the block step value. It is therefore possible to understand that the Y start address register 62 is a portion of the top address register.

The X address generator 66 serves as a first address generator and is coupled to the determinant register and to the top address register. The first address generator is for generating a first address signal representative of a first or consecutive portion of the serial memory element addresses for each of the specific memory blocks. The first portion is from the top address to one of the serial memory element addresses that is equal to the top address plus the number m less one.

The Y address generator 67 serves as a second address generator and is coupled to the determinant register and to the top address register. The second address generator is for generating a second address signal representative of a second or discrete portion of the serial memory element addresses. The second portion is from the top address modulo the block step value plus products of the block step value and multipliers which are from zero to the number n less one.

A combination of the X and the Y address compensating circuits 36 and 37 and the output address generator 69 serves as an output generating device. Responsive to the first and the second address signals, the output generating device generates an output address signal which specifies the serial memory element addresses in parallel for the respective specific memory blocks. Inasmuch as the output address signal represents the serial memory element addresses which are always within the serial memory element addresses of the memory elements of the display memory 21, the X and the Y address compensating circuits 36 and 37 need not carry out compensation but produce the first and the second address signals as they are. It is therefore possible in this event to use no address compensating circuits in the address logic circuit.

Reviewing FIG. 15 again together with FIGS. 2 and 3, the address logic circuit may be used as follows on storing a selected region of the image datum 25 in the display memory 21 as the image part. The block data may be X in number along each row thereof and Y in number along each column thereof. It is to be noted in this connection that the serial image element addresses consecutively increase one by one along each row of the image elements of the image datum 25 and stepwise increase by a data step value mX between two columnwise consecutive ones of the image elements.

The determinants further comprise another product nN, the data step value, an image column range, and an image row range. Inasmuch as the selected region is congruent with the image part, the block column and row ranges cooperatively specify the memory blocks of the display memory 21 altogether as the specific memory blocks. At any rate, the image column and row ranges correspond to the block column and row ranges, respectively. The image column and row ranges cooperatively specify specific ones of the block data as specific block data which coincide with the selected region.

As before, the top address register furthermore memorizes signals representative of a row-wise and a column-wise start addresses for each of the specific block data. The row-wise start address is the serial image element address which is least among the serial image element addresses of the image elements of the block datum under consideration. The column-wise start address is congruent with the row-wise start address modulo the data step value.

The first address generator is for making the first address signal furthermore represent a first or consecutive portion of the serial image element addresses for each of the specific block data. The first portion of the serial image element addresses is from the row-wise start address to one of the serial image element addresses that is equal to the row-wise start address plus the number m less one.

The second address generator is for making the second address signal furthermore represent a second or discrete portion of the serial image element addresses. The second portion of the serial image element addresses is equal to the column-wise start address plus products of the data step value and the multipliers mentioned above, respectively.

The X address compensating circuit 36 serves as a first address compensating circuit which is coupled to the determinant register. Responsive to the first address signal, the first address compensating circuit calculates compensated row-wise addresses by subtracting an integral multiple of the number m from at least a portion of the first portion of the serial image element addresses so that the compensated row-wise addresses do not exceed the product mM.

The Y address compensating circuit 37 serves as a second address compensating circuit which is coupled to the determinant register. Responsive to the second address signal, the second address compensating circuit calculates compensated column-wise addresses by subtracting an integral multiple of the number n from at least a portion of the second portion of the serial image element addresses so that the compensated column-wise addresses do not exceed the product nN.

The output address generator 69 now serves as a device responsive to the compensated row-wise and column-wise addresses for each of the specific block data to produce an additional output address signal. The last-mentioned serial image element addresses are represented by the additional output address signal.

While this invention has thus far been described in specific conjunction with a single preferred embodiment thereof, it will now be readily possible for one skilled in the art to put this invention into practice in various other manners. For example, the image datum may be a three-dimensional image datum given by an X-Y-Z coordinate system. The display part may be scrolled either on an X-Z plane at an optional Y value or along the Z axis of the X-Y-Z coordinate system. It will also be readily possible for this purpose to modify the address logic circuit illustrated with reference to FIG. 15 so that the address logic circuit may specify serial image element addresses of the three-dimensional image datum or the serial memory element addresses in relation to such serial image element addresses.

What is claimed is:

1. In a display managing arrangement comprising a display memory for memorizing an image part of an image datum and a display memory controller for controlling said display memory to specify a display part on said image part, said display memory comprising a plurality of memory blocks arranged as a matrix of rows, N in number, and columns, M in number, each of said memory blocks comprising a plurality of memory elements arranged as another matrix of rows, n in number, and columns, m in number, and having serial memory element addresses, respectively, said serial memory element addresses consecutively increasing along each row of the memory elements of said display memory and stepwise increasing by a block step value mM between two column-wise consecutive ones of said memory elements, wherein said display memory controller comprises:

- a determinant register for storing signals representative of the numbers m and n, said step value, a block column range, and a block row range, said block column and row ranges specifying specific ones of said memory blocks as specific memory blocks by the numbers M and N;
- a top address register for storing a signal representative of a top address for each of the memory blocks of said display memory, said top address being the serial memory element address which is least among the serial memory element addresses of said each of the memory blocks;
- a first address generator coupled to said determinant register and to said top address register for generating a first address signal representative of a first portion of said serial memory element addresses for each of said specific memory blocks, said first portion being consecutive from said top address to one of said serial memory element addresses that is equal to said top address plus m less one;
- a second address generator coupled to said determinant register and to said top address register for generating a second address signal representative of a second portion of said serial memory element addresses, said second portion being congruent modulo said block step value with the top address plus integral multiples of said step value, said integral multiples being from zero to the number n less one; and
- accessing means connected to said first and said second address generators and to said display memory for accessing the serial memory element addresses of each of said specific memory blocks.

2. A display managing arrangement as claimed in claim 1, wherein said specific memory blocks are for storing said display part.

3. A display managing arrangement as claimed in claim 1, wherein said display memory controller accesses said image datum to store a selected region thereof in said display memory as said image part, said image datum being divided into a plurality of block data arranged as a matrix of columns, X in number, and rows, Y in number, each block datum being divided into a plurality of image elements arranged as a matrix of m columns and n rows, the image elements of said image datum being assigned with serial image element addresses, respectively, said image element addresses consecutively increasing along each row of the image elements of said image datum and stepwise increasing by a data step value mX between two column-wise consecutive ones of said image elements, wherein:

- said determinant register further stores signals representative of another product nN, said data step value, an image column range representing said block column range, and an image row range representing said block row range, said image column and row ranges specifying specific ones of said block data as specific block data;
- said top address register further stores signals representative of a row-wise and a column-wise start address for each of said specific block data, and row-wise start address being the serial image element address which is least among the serial image element addresses of the image elements of the block datum under consideration, said column-wise start address being congruent with said row-wise start address modulo said data step value;
- said first address generator generating said first address signal representative of a first portion of said serial image element addresses for each of said specific block data, said first portion of the serial image element addresses being consecutively from said row-wise start address to one of said serial image element addresses that is equal to said row-wise start address plus the number m less one;
- said second address generator generating said second address signal representative of a second portion of said serial image element addresses, said second portion of the serial image element addresses being equal to said column-wise start address plus multiples of said data step value;

said accessing means comprising:

a first address compensating circuit coupled to said determinant register and responsive to said first address signal for calculating compensated row-wise addresses by subtracting an integral multiple of the number m from at least a portion of said first portion of the serial image element addresses so that said compensated row-wise addresses do not exceed the product mM;

a second address compensating circuit coupled to said determinant register and responsive to said second address signal for calculating compensated column-wise addresses by subtracting an integral multiple of the number n from at least a portion of said second portion of the serial image element addresses so that said compensated column-wise addresses do not exceed the product nN; and output means responsive to said compensated row-wise and column-wise addresses for calculating the serial image element addresses for each of said specific block data to produce an additional output address signal representative of the last-mentioned serial image element addresses.

4. A display managing arrangement as claimed in claim 3, wherein said specific memory blocks are the memory blocks of said display memory.

* * * * *